(12) United States Patent
Angelo et al.

(10) Patent No.: US 12,325,843 B2
(45) Date of Patent: Jun. 10, 2025

(54) METHODS FOR REGENERATING CHROMATOGRAPHY RESINS

(71) Applicant: BRISTOL-MYERS SQUIBB COMPANY, Princeton, NJ (US)

(72) Inventors: James Angelo, Devens, MA (US); Xuankuo Xu, Devens, MA (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 701 days.

(21) Appl. No.: 17/604,083

(22) PCT Filed: Apr. 16, 2020

(86) PCT No.: PCT/US2020/028480
§ 371 (c)(1),
(2) Date: Oct. 15, 2021

(87) PCT Pub. No.: WO2020/214792
PCT Pub. Date: Oct. 22, 2020

(65) Prior Publication Data
US 2022/0220423 A1 Jul. 14, 2022

Related U.S. Application Data

(60) Provisional application No. 62/835,049, filed on Apr. 17, 2019.

(51) Int. Cl.
| | | |
|---|---|---|
| B01D 15/20 | (2006.01) | |
| B01D 15/38 | (2006.01) | |
| C11D 3/00 | (2006.01) | |
| C11D 7/06 | (2006.01) | |
| C11D 7/26 | (2006.01) | |

(52) U.S. Cl.
CPC .............. *C11D 7/06* (2013.01); *B01D 15/203* (2013.01); *B01D 15/3809* (2013.01); *C11D 3/0047* (2013.01); *C11D 7/261* (2013.01); *C11D 7/265* (2013.01); *C11D 2111/20* (2024.01)

(58) Field of Classification Search
CPC ........... C11D 7/06; C11D 7/261; C11D 7/265; C11D 3/0047; C11D 2111/20; B01D 15/203; B01D 15/3809
See application file for complete search history.

(56) References Cited

U.S. PATENT DOCUMENTS

| | | |
|---|---|---|
| 4,816,567 A | 3/1989 | Cabilly et al. |
| 5,534,615 A | 7/1996 | Baker et al. |
| | (Continued) | |

FOREIGN PATENT DOCUMENTS

| | | |
|---|---|---|
| EP | 2527429 A2 | 11/2012 |
| JP | H10221323 A | 8/1998 |
| | (Continued) | |

OTHER PUBLICATIONS

Cytiva Life Sciences, "Licensing Statements". Aug. 2, 2023.*
(Continued)

*Primary Examiner* — Benjamin L Lebron
(74) *Attorney, Agent, or Firm* — Sterne, Kessler, Goldstein & Fox P.L.L.C.

(57) ABSTRACT

The invention provides improved methods of regenerating and using affinity chromatography resin, in particular Protein A affinity chromatography resins.

20 Claims, 9 Drawing Sheets

(56) References Cited

U.S. PATENT DOCUMENTS

| | | | | |
|---|---|---|---|---|
| 8,198,404 B2* | 6/2012 | Hober | ............... | B01D 15/3809 |
| | | | | 530/324 |
| 2012/0301429 A1* | 11/2012 | Hartman | ................... | A61L 2/18 |
| | | | | 435/320.1 |
| 2015/0093800 A1* | 4/2015 | Mahajan | ............ | B01D 15/3809 |
| | | | | 530/416 |

FOREIGN PATENT DOCUMENTS

| | | |
|---|---|---|
| WO | WO-2006126942 A1 | 11/2006 |
| WO | WO-2015034566 A1 | 3/2015 |
| WO | WO-2015035180 A1 | 3/2015 |
| WO | WO-2018140887 A1 | 8/2018 |
| WO | WO-2020214792 A1 | 10/2020 |

OTHER PUBLICATIONS

Zhou, T., et al., "An enhanced regeneration strategy to improve microbial control and prolong resin lifetime for Protein A resin in large-scale monoclonal antibody (mAb) purification", Journal of Biotechnology, 289, pp. 118-125. (Year: 2019).*

Koza, Stephan, "Developing SEC Methods for Proteins and Modified Proteins", Biopharma LC Meeting Oct. 16-17, 2012.*

Brasel, K., et al., "Hematologic effects of flt3 ligand in vivo in mice," Blood 88(6):2004-2012, American Society of Hematology, United States (1996).

Carter, P. et al., "High Level *Escherichia coli* Expression and Production of a Bivalent Humanized Antibody Fragment," Nature Biotechnology 10:163-167, Nature Publishing Group, United Kingdom (1992).

Fahrner, R. L., et al., "Performance comparison of protein A affinity-chromatography sorbents for purifying recombinant monoclonal antibodies," Biotechnology and Applied Biochemistry 30(2):121-128, Wiley Online Library, United States (1999).

International Search Report and Written Opinion mailed Jul. 24, 2020 in International Patent Application No. PCT/US2020/028480, European Patent Office, Netherlands, 12 pages.

Kaufman, R.J., "Selection and coamplification of heterologous genes in mammalian cells," Methods Enzymol 185:537-566, Elsevier, Netherlands (1990).

Kaufman, R.J., et al., "Synthesis, processing, and secretion of recombinant human factor VIII expressed in mammalian cells," J. Biol. Chem. 263(13):6352-6362, Elsevier, Netherlands (1988).

Kelly, B.D, "Very Large Scale Monoclonal Antibody Purification: The Case for Conventional Unit Operations," Biotechnology Progress 23(5):995-1008, Wiley Online Library, United States (2007).

McKinnon, P et al., "Expression, purification and characterization of secreted recombinant human insulin-like growth factor-I (IGF-I) and the potent variant des(1-3)IGF-I in Chinese hamster ovary cells," Journal of Molecular Endocrinology 6:231-239, Journal of Endocrinology, Great Britain (1991).

Urlaub, G., et al., "Isolation of Chinese hamster cell mutants deficient in dihydrofolate reductase activity," Proc Natl Acad Sci USA 77(7):4216-4220, United States National Academy of Sciences, United States(1980).

Wood, C.R., et al., "High level synthesis of immunoglobulins in Chinese hamster ovary cells," J. Immunol 145(9):3011-3016, American Association of Immunology, United States (1990).

* cited by examiner

| Comments | Microorganism | 167 mM Acetic Acid, 120 mM Phosphoric Acid, 2% Benzyl Alcohol | | | | | | 167 mM Acetic Acid, 2% Benzyl Alcohol | | | | | |
|---|---|---|---|---|---|---|---|---|---|---|---|---|---|
| | (minutes) | 0 | 15 | 30 | 45 | 60 | 0 | 15 | 30 | 45 | 60 |
| Spore former | Bacillus alcalophilus | 3.3 | >4.3 | >4.3 | >4.3 | >4.3 | >4.3 | >4.3 | >4.3 | >4.3 | >4.3 |
| Spore former | Bacillus cereus | 0 | 0 | 0.3 | 0.3 | 0.4 | 0.6 | 0.6 | 0.8 | 0.7 | 0.6 |
| | Stenotrophomonas maltophilia | >4.7 | >4.7 | >4.7 | >4.7 | >4.7 | >4.7 | >4.7 | >4.7 | >4.7 | >4.7 |
| | Microbacterium laevaniformans | >5.8 | >5.8 | >5.8 | >5.8 | >5.8 | >5.8 | >5.8 | >5.8 | >5.8 | >5.8 |
| Spore former | Bacillus subtilis | 0.3 | 0.6 | 0.6 | 0.3 | 0.5 | 0.5 | 0.3 | 1.1 | 1.1 | 1.1 |
| | Candida albicans | 0.6 | >4.6 | >4.6 | >4.6 | >4.6 | 0.4 | >4.6 | >4.6 | >4.6 | >4.6 |
| Spore former | Aspergillus brasiliensis | 0.4 | >4.7 | >4.7 | >4.7 | >4.7 | 0.5 | 2.5 | 4.1 | >4.7 | >4.7 |

| Comments | Microorganism | 30 mM Sodium Hydroxide, 230 mM Sodium Citrate, 1% Benzyl Alcohol | | | | | | 250 mM Sodium Hydroxide, 230 mM Sodium Citrate, 1% Benzyl Alcohol | | | | | |
|---|---|---|---|---|---|---|---|---|---|---|---|---|---|
| | (minutes) | 0 | 15 | 30 | 45 | 60 | 0 | 15 | 30 | 45 | 60 |
| Spore former | Bacillus alcalophilus | 3.4 | 3.9 | 3.4 | 4.1 | 3.8 | 3.4 | 3.3 | 3.6 | 3.9 | 3.9 |
| Spore former | Bacillus cereus | 0.4 | 0.5 | 0.7 | 0.7 | 0.5 | 0.8 | 0.7 | 0.7 | 0.8 | 0.8 |
| | Stenotrophomonas maltophilia | >4.7 | >4.7 | >4.7 | >4.7 | >4.7 | >4.7 | >4.7 | >4.7 | >4.7 | >4.7 |
| | Microbacterium laevaniformans | 0 | 5.8 | >5.8 | >5.8 | >5.8 | 5.8 | >5.8 | >5.8 | >5.8 | >5.8 |
| Spore former | Bacillus subtilis | <0.3 | 0.3 | 0.4 | 0.4 | 0.3 | 0.8 | 1 | 1.1 | 1.1 | 1.2 |
| | Candida albicans | 1.2 | >4.6 | >4.6 | >4.6 | >4.6 | >4.6 | >4.6 | >4.6 | >4.6 | >4.6 |
| Spore former | Aspergillus brasiliensis | 0.5 | 0.4 | 0.7 | 1.4 | 1.7 | 1.6 | >4.7 | >4.7 | >4.7 | >4.7 |

Fig. 7

METHODS FOR REGENERATING CHROMATOGRAPHY RESINS

REFERENCE TO RELATED APPLICATIONS

This application is the U.S. National Phase of International Application No. PCT/US2020/028480, filed on Apr. 16, 2021, which claims the priority benefit of U.S. Provisional Application No. 62/835,049, filed Apr. 17, 2019, each of which is incorporated herein by reference in its entirety.

FIELD

The presently disclosed subject matter generally relates to chromatography and cleaning of chromatography resins.

BACKGROUND OF THE INVENTION

Chromatography resins are used in the purification of a desired protein from other impurities in a sample solution. Such resins are often used for purification of biopharmaceuticals, e.g., monoclonal antibodies (Mab) and other Fc-containing proteins by affinity chromatography. Affinity chromatography exploits protein-ligand interactions by coupling to the resin a ligand that specifically binds the protein of interest, e.g., the ligand Protein A which is capable of binding the Fc-region of antibodies. Although Protein A affinity chromatography is a very effective method of protein purification, the costs of Protein A resin care significant, comprising a substantial portion of the raw resin costs in MAb manufacturing (Fahrner, R. L., et al., Biotechnol. Appl. Biochem. 1999, 30, 121-128; Kelley, B., Biotechnol. Prog. 2007, 23:995-1008). The issue of Protein A resin cost is further exacerbated by the resin's typically short life span due to the rapid reduction of its overall performance and binding capacity after only a few purification cycles. This means that, typically, new Protein A is required to be purchased and used quite often in a large-scale protein purification project, further increasing the overall cost of protein purification. The reduction in resin performance and binding capacity is often due to fouling of the resin by a build-up of impurities on the resin from both the product and the process.

Therefore, there is a need for a method that increases the life span of chromatography resins by prolonging their overall performance and binding capacity, for example by regenerating and/or cleaning the chromatography resin while maintaining the resin's integrity.

BRIEF SUMMARY OF THE INVENTION

The invention provides methods to clean and/or regenerate a chromatography resin. The chromatography resin may be cleaned and/or regenerated for use with the same product or with different product.

In one embodiment, the invention provides a method for cleaning a chromatography resin, comprising contacting the chromatography resin with a first buffer comprising acetic acid and benzyl alcohol and a second buffer comprising sodium hydroxide, sodium citrate, and benzyl alcohol. In one embodiment, the first buffer does not contain phosphoric acid. In one embodiment, the first buffer comprises about 150-200 mM acetic acid and about 1-3% (v/v) benzyl alcohol. In one embodiment, the second buffer comprises about 100-300 mM sodium hydroxide, about 100-300 mM sodium citrate, and about 0.5-1.5% (v/v) benzyl alcohol. In one embodiment, the first buffer comprises about 167 mM acetic acid. In one embodiment, the first buffer comprises about 2% (v/v) benzyl alcohol. In one embodiment, the second buffer comprises about 200 mM sodium hydroxide. In one embodiment, the second buffer comprises about 200 mM sodium citrate. In one embodiment, the second buffer comprises about 1% (v/v) benzyl alcohol. In one embodiment, the first buffer comprises about 167 mM acetic acid and about 2% (v/v) benzyl alcohol, and the second buffer comprises about 200 mM sodium hydroxide, about 200 mM sodium citrate and about 1% (v/v) benzyl alcohol.

In one embodiment, the first buffer comprises about 167 mM acetic acid and about 2% (v/v) benzyl alcohol, and the second buffer comprises about 100 mM sodium hydroxide, about 200 mM sodium citrate and about 1% (v/v) benzyl alcohol.

In one embodiment, a neutralization buffer is passed through the chromatography resin after the first buffer and before the second buffer.

In one embodiment, the chromatography resin is held in the first buffer for about 15 minutes or less. In one embodiment, the chromatography resin is held in the second buffer for about 15 minutes or less. In one embodiment, the chromatography resin is held in the second buffer for about 45 minutes or less. In one embodiment, the reuse occurs on the same day as the cleaning.

In one embodiment, the chromatography resin resides in a chromatography column.

In one embodiment, the chromatography resin is an affinity resin. In one embodiment, the chromatography resin comprises an affinity ligand coupled to a support. In one embodiment, the affinity ligand is *Staphylococcus* Protein A, or a portion or derivative thereof. In one embodiment, the affinity ligand is *Staphylococcus* Protein G, or a portion or derivative thereof. In one embodiment, the resin or support comprises a polymer selected from the group consisting of polysaccharide, agarose, polyvinylether, polyvinylalcohol, polymethacrylate, polyacrylate, polystyrene, polyacrylamide, polymethacrylamide and polycarbonate, or mixtures thereof.

The invention also provides a method of purifying a polypeptide, comprising steps of applying the polypeptide to a chromatography resin and cleaning the chromatography resin using the methods described herein.

In one embodiment, the binding capacity of the cleaned chromatography resin is preserved after the chromatography resin has been cleaned, using the methods described herein. In one embodiment, the binding capacity is preserved after 50 or more, 100 or more, 150 or more, or 200 or more cleanings.

In one embodiment, the chromatography resin pressure does not increase during the course of cleaning the chromatography resin, using the methods described herein. In one embodiment, the chromatography resin pressure does not increase after 50 or more, 100 or more, 150 or more, or 200 or more cleanings.

In one embodiment, the polypeptide is an immunoglobulin comprising a CH2 domain and a CH3 domain. In one embodiment, the polypeptide is an antibody or antigen binding fragment thereof. In one embodiment, the antibody is an IgG monoclonal antibody. In one embodiment, the IgG monoclonal antibody is a chimeric antibody, humanized antibody, or human antibody. In one embodiment, the polypeptide is an enzyme, a hormone, a fusion protein, an immune-conjugate, a cytokine or an interleukin.

The invention also provides a method for cleaning an affinity chromatography column containing a chromatography resin, comprising cleaning the chromatography resin with one or more cleaning cycles, wherein each cleaning cycle comprises contacting the chromatography resin with a first solution comprising acetic acid and benzyl alcohol for about 15 minutes or less, and a second solution comprising sodium hydroxide, sodium citrate, and benzyl alcohol for about 15 minutes or less, or for about 45 minutes or less. In one embodiment, the first solution does not comprise phosphoric acid. In one embodiment, the method results in increased microbial killing. In one embodiment, the method results in a reduction in host cell protein fouling. In one embodiment, the method results in reduction of yield decay.

BRIEF DESCRIPTION OF THE DRAWINGS

FIG. 7 shows the microbial kill of different cleaning solutions applied for various times.

DETAILED DESCRIPTION OF THE INVENTION

Figure 1:
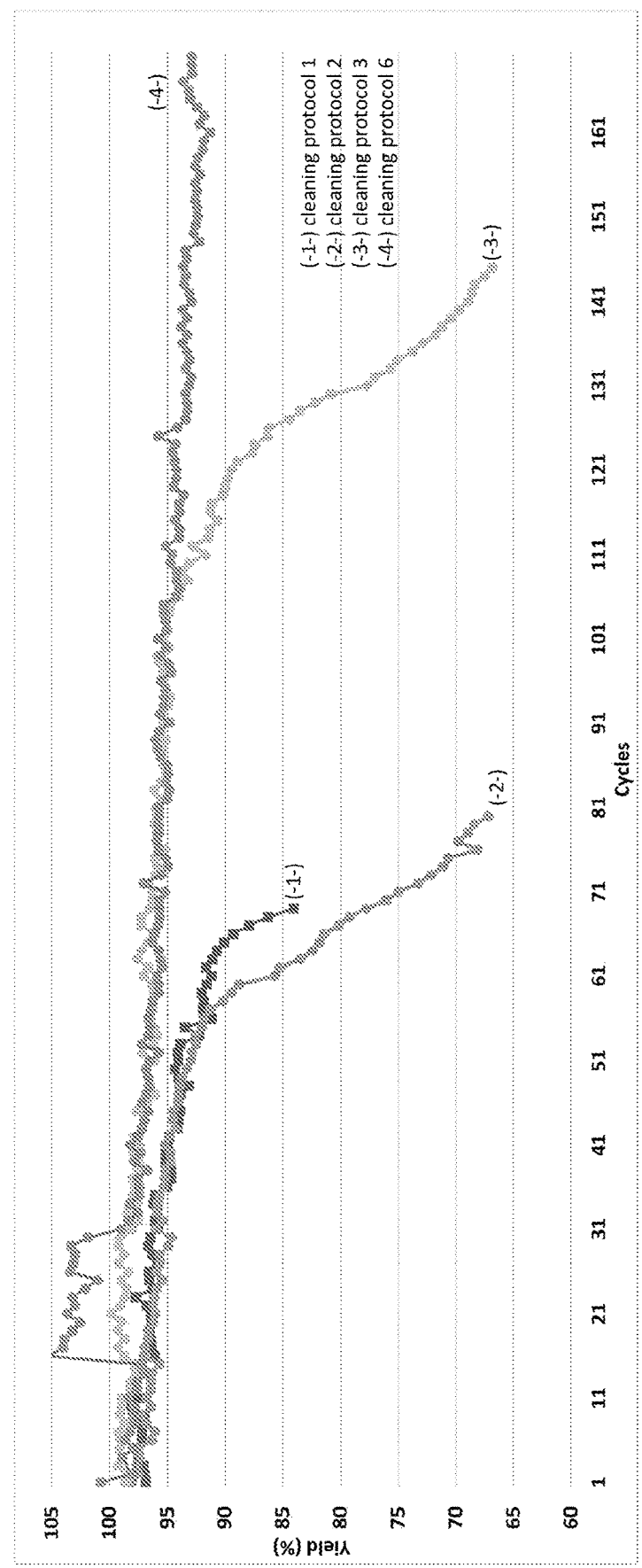
FIG. 1 shows the Protein A step yield at increasing purification cycle numbers for cleaning protocol 1 (-1-), cleaning protocol 2 (-2-), cleaning protocol 3 (-3-) and cleaning protocol 6 (-4-).

Provided herein are methods for cleaning or regenerating a chromatography resin. The methods of the invention can be used for the regeneration of small-scale and large-scale (e.g. manufacturing-scale) chromatography resin. Currently accepted processes for cleaning chromatography resin include an acidic strip step using phosphoric acid. The present invention is based on the surprising and unexpected discovery that chromatography resin can be cleaned without the use of harsh agents, such as phosphoric acid. Use of phosphoric acid, capable of cleaning foulants on silica- or methacrylate-based stationary phases, but not on agarose-based stationary phases, contributes to pressure increases caused by blockages in the system which can result in yield decay.

Definitions

The term "chromatography," as used herein, refers to a dynamic separation technique which separates a target molecule such as a target protein (e.g., an immunoglobulin or another Fc-containing protein) from other molecules in the mixture and allows it to be isolated. Typically, in a chromatography method, a liquid mobile phase transports a sample containing the target molecule of interest across or through a stationary phase (normally solid) medium. Differences in partition or affinity to the stationary phase causes the temporary binding of selected molecules to the stationary phase while the mobile phase carries different molecules out at different times.

The term "affinity chromatography," as used herein, refers to a mode of chromatography where a target molecule, such as a protein molecule (e.g., an Fc-containing protein) to be separated is isolated by its "lock-and-key" interaction with a molecule (e.g., a Protein A based ligand) immobilized on the chromatography resin. This specific interaction allows the target molecule to bind while the undesirable molecules flow through. Changing the temperature, pH, or ionic strength of the mobile phase then releases the target molecule in high purity. In various embodiments described herein, affinity chromatography involves the addition of a sample containing a target molecule (e.g., an immunoglobulin or another Fc-containing protein) to a solid support which carries on it a ligand based on the C domain (or modified B domain in some cases) of Protein A (referred to as Protein A affinity chromatography media or resin). Other ligands used for affinity chromatograph can include Protein G from *Steptococci* which binds to the Fc region of an immunoglobulin.

The term "Protein A affinity chromatography," as used herein, refers to the separation or isolation of substances using Protein A, a protein found in the cell wall of the bacterium *Staphylococcous aureus*, that is capable of binding to immunoglobulins at the Fc region. Protein A is immobilized on a solid support and is contacted with the protein of interest.

The term "solid support" refers in general to any resin (porous or non-porous) to which a ligand is attached. The attachment of ligands to the solid support can either be through a covalent bond, such as in the case of grafting (via ether, thioether, carbon-carbon bond, or other linkages), or through coating, adhesion, adsorption, and similar mechanisms. Exemplary solid supports used in the methods described herein include polysaccharide, agarose, polyvinylether, polyvinylalcohol, polymethacrylate, polyacrylate, polystyrene, polyacrylamide, polymethacrylamide and polycarbonate.

Examples of Protein A affinity chromatography resins known in the art include those having the Protein A immobilized onto a controlled pore glass backbone, e.g., PROSEP™ media/resin (EMD MILLIPORE); those having Protein A immobilized onto a polystyrene solid phase, e.g., the POROS™ MabCapture™ A media/resin (APPLIED BIOSYSTEMS. INC.); and those having Protein A immobilized on an agarose solid support, e.g., rPROTEIN A SEPHAROSE FAST FLOW™ or MABSELECT™ media or resins (GE HEALTHCARE).

The term "affinity resin" or "affinity chromatography resin" or "affinity media" or "affinity chromatography media", as used interchangeably herein, refers to an affinity chromatography ligand (e.g., based on Protein A) attached to a solid support such as, e.g., those described herein (resulting in, e.g., Protein A affinity resin, or Protein A resin). In general, the terms "affinity resin" and "affinity media" are used interchangeably herein. Other examples of affinity chromatography resin include resin with Protein G from *Streptococci* capable of binding to the Fc region of immunoglobulins. Also included are affinity resins with Protein L which binds immunoglobulins through the kappa light chain. These proteins can be used in an affinity chromatography to purify immunoglobulins or other proteins which bind specifically to these affinity resins.

The term "polypeptide" or "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art. The terms "polypeptide" and "protein" as used herein specifically encompass antibodies and Fc domain-containing polypeptides (e.g., immunoadhesins).

The term "target protein" or "protein of interest." as used interchangeably herein, refers to any protein that can be purified using the affinity resin, e.g. Fc-containing molecule for Protein A. In various embodiments, the target protein is an Fc-containing protein, e.g., an immunoglobulin or an Fc-fusion protein.

The term "immunoglobulin," "Ig" or "antibody" (used interchangeably herein) refers to a protein comprising at least two heavy (H) chains and two light (L) chains interconnected by disulfide bonds. Each heavy chain is comprised of a heavy chain variable region (abbreviated herein as VH) and a heavy chain constant region (abbreviated herein as CH). In certain antibodies, e.g., naturally occurring IgG antibodies, the heavy chain constant region is comprised of a hinge and three domains, CH1, CH2 and CH3. In certain antibodies, e.g., naturally occurring IgG antibodies, each light chain is comprised of a light chain variable region (abbreviated herein as VL) and a light chain constant region. The light chain constant region is comprised of one domain (abbreviated herein as CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system. A heavy chain may have the C-terminal lysine or not. Unless specified otherwise herein, the amino acids in the variable regions are numbered using the Kabat numbering system and those in the constant regions are numbered using the EU system. "Antibody" includes, by way of example, both naturally occurring and non-naturally occurring antibodies; monoclonal and polyclonal antibodies; chimeric and humanized antibodies; human and nonhuman antibodies and wholly synthetic antibodies.

Immunoglobulins or antibodies may be monoclonal or polyclonal and may exist in monomeric or polymeric form, for example. IgM antibodies which exist in pentameric form and/or IgA antibodies which exist in monomeric, dimeric or multimeric form. The term "fragment" used in conjunction with "antibody" refers to a part or portion of an antibody or antibody chain comprising fewer amino acid residues than an intact or complete antibody or antibody chain. Fragments can be obtained via chemical or enzymatic treatment of an intact or complete antibody or antibody chain. Fragments can also be obtained by recombinant means. Exemplary fragments include Fab, Fab', F(ab')$_2$, Fc and/or Fv fragments. An antibody or fragment to be purified can be human, humanized, or chimeric.

It is understood that the target protein purified using the methods described herein is one which contains an Fc region and therefore is amenable to purification by Protein A or Protein G from *Steptococci*. The term "Fc region" or "Fc," as used herein, refers to those amino acid residues of an immunoglobulin molecule which interact with Protein A. The Fc region is the crystallizable tail region of an antibody and interacts with cell surface receptors called Fc receptors.

The term "Fc-binding," "binds to an Fc portion" or "binding to an Fc portion" refers to the ability of an affinity ligand described herein, to bind to the constant domain (Fc) of an antibody. In some embodiments, a ligand according to the present invention binds an Fc portion of an antibody (e.g., human IgG1, IgG2 or IgG4) with an affinity of at least $10^{-7}$ M, or at least $10^{-8}$ M, or at least $10^{-9}$ M.

As used herein, the term "fragment(s)" may also refer to a portion of a full length Fc-containing protein such as, e.g., an immunoglobulin. Examples of fragments include Fab fragments, single-chain antibody molecules, diabodies, linear antibodies, and multispecific antibodies formed from antibody fragments.

Reference to "about" a value or parameter herein includes (and describes) variations that are directed to that value or parameter per se. Descriptions referring to "about X" also include description of "X".

As used herein and in the appended claims, the singular forms "a," "or," and "the" include plural referents unless the context clearly dictates otherwise. It is understood that aspects and variations of the invention described herein include "comprising," "consisting" and/or "consisting essentially of" aspects and variations.

Methods of the Invention

Cleaning the Chromatography Resin

The present invention provides a method of efficiently regenerating or cleaning affinity chromatography resins. Using the methods of the invention results in a more efficient cleaning process, which in turn results in increased lifetime of resin material. The more efficient cleaning methods of the invention permit extended performance of affinity resins for use in large-scale production of protein products.

As used herein, the term "cleaning" refers to a step during the process of purifying a target protein (e.g., an immunoglobulin or another Fc-containing protein) which entails removing impurities and foulants left on an affinity chromatography resin, for example, in a column (e.g., a Protein A column) in order to retain the performance of the resin. While the step of cleaning removes impurities from the resin, it should ideally have a minimal impact on the integrity of the resin, as measured using binding capacity (the amount of target protein the resin can purity) and/or resolution (the ability for the resin to separate the target protein from undesirable entities). Often, commercially available affinity chromatography resins, e.g., employing *Staphylococcus* Protein A or a derivative thereof, are cleaned using a solution containing phosphoric acid or an alkaline solution using NaOH. For example. Mab Select SuRe™.

Protein A column is cleaned with diluted NaOH. On the other hand, Prosep™. Protein A column is generally cleaned using phosphoric acid.

The term "binding capacity" refers to the amount of a molecule which will bind to a defined volume of resin or media packed in a column run under defined conditions. Binding capacity can be measured as static binding capacity or dynamic binding capacity. In case of static binding capacity, the amount of a molecule that binds to a defined volume of resin when the molecule and the resin are in contact for infinite amount of time, is determined. Static binding capacity measures the highest amount of a target molecule that a resin can bind. In practice, the value is often obtained by contacting excess of the target molecule with the resin for equal to or longer than 4 hours with minimal or no flow. Dynamic binding capacity, on the other hand, is the amount of a target molecule the resin can bind per volume of resin at a set flow rate. The dynamic binding capacity for any resin is highly dependent on the underlying conditions. In general, the lower the flow rates, the higher the dynamic binding capacity. As the flow rate approaches zero, the binding capacity approaches the maximum available capacity-static binding capacity. Without proper cleaning and sanitization, the binding capacity of affinity resin typically drops below the initial value after multiple bind and elute cycles. When the binding capacity is lower than a certain value which is set during a chromatography method/process development, a significant amount of the target protein could "breakthrough," or co-elute with the flow through fraction containing impurities, leading to loss of product. Proper cleaning using suitable chemicals can maintain resin binding capacity over an extended period of time.

Cleaning of Protein A affinity resin is commonly practiced after each cycle to ensure that the resin will perform purification consistently throughout the life cycle of the resin, or in other words, in order to preserve the binding capacity of the resin. Cleaning is especially important for Protein A affinity chromatography resin for two reasons: (1) Protein A resin has high initial cost compared with ion exchange or hydrophobic interaction (HIC) resins and; (2) Protein A chromatography resin is typically exposed to the clarified cell culture which contains higher level of impurities. Therefore, some residual impurities can bind to the Protein A resin, thereby leading to loss of binding capacity or increase of elution pool impurity upon re-use of the resin. This is highly undesirable in a manufacturing setting as it leads to decreased productivity (due to a decrease in binding capacity) and poorer product purity. Routine cleaning after each Protein A bind and elute cycle is, thus, critical to ensure consistent resin performance which leads to consistent product purity and process throughput.

As used herein, the term "cycle" or "affinity cycle" or "Protein A affinity chromatography purification cycle" refers to a multi-step process which starts with equilibration of the chromatography column which employs affinity resin, with a neutral buffer; followed by loading of a clarified cell culture feed to the column, where the clarified cell culture feed contains the target protein to be purified. In the case of Protein A affinity resin, the target protein can be Fc-containing protein to be purified (e.g., a monoclonal antibody); followed by washing the column with one or more (often three) different buffers to remove loosely bound impurities, which does not interfere with the binding of the target protein to the ligand, or for example Fc-containing protein to the Protein A resin; followed by eluting the target protein from the affinity resin, e.g., Fc-containing protein from of the Protein A resin, using an elution buffer (e.g., having a pH of 2.5-4.5). This multi-step process of equilibration, loading, washing and elution constitutes a cycle or a bind and elute cycle. A cycle is typically followed by a cleaning step to remove trace levels of impurities on the column before the next cycle.

In some embodiments described herein, resin cleaning is performed using a first wash buffer comprising acetic acid and benzyl alcohol and a second wash buffer comprising sodium hydroxide, sodium citrate, and benzyl alcohol. The term "wash buffer" as used herein in connection with cleaning refers to the buffer that is passed over the solid support (e.g. with immobilized Protein A) following elution of the target protein.

In some embodiments, a chromatography resin is contacted with both a first buffer and a second buffer after each cycle. In other embodiments, a chromatography resin is contacted with either the first buffer or the second buffer after a cycle, such that the first and second buffers are used in an alternating manner through the purification campaign. In some embodiments, a chromatography resin is contacted with a second buffer and then a first buffer.

The invention provides buffers for use in the methods of the invention. A first buffer, of the invention does not contain phosphoric acid. In one embodiment, the first buffer may comprise for example about 100-300 mM acetic acid, or about 125-250 mM acetic acid, or about 150-200 mM acetic acid, or about 167 mM acetic acid. The first buffer may also comprise about 2-4% (v/v) benzyl alcohol, or about 2.5-3.5% (v/v) benzyl alcohol, or about 2-3% (v/v) benzyl alcohol, or about 1.5-2.5% (v/v) benzyl alcohol, or about 1-2% (v/v) benzyl alcohol, or about 2% (v/v) benzyl alcohol. In one embodiment, the first buffer comprises 167 mM acetic acid and about 2% (v/v) benzyl alcohol.

In another embodiment, the present invention provides a second buffer used to reduce the microbial contamination burden and optionally prepare the resin for storage. A second buffer of the present invention may comprise, for example, sodium hydroxide at about 50-400 mM, or about 100-350 mM, or about 150-300 mM, or about 100-300 mM, or about 100-300 mM, or about 200 mM. The second buffer may also comprise sodium citrate at about 50-400 mM, or about 100-350 mM, or about 150-300 mM, or about 100-300 mM, or about 100-300 mM, or about 200 mM. The second buffer may also comprise benzyl alcohol at about 0.5-3% (v/v), or about 0.5-1.5% (v/v), or about 1-2% (v/v), or about 1.5-2.5% (v/v), or about 1% (v/v). A nonlimiting example of a second buffer is about 200 mM sodium hydroxide, 200 mM sodium citrate, and 1% (v/v) benzyl alcohol.

In one embodiment, the chromatography resin is located in a chromatography column. In some embodiments, the column is washed with at least two, three, four or five column volumes. In some embodiments, the column is washed with the first buffer and second buffer until no or essentially no impurities further elute from the column.

In some embodiments of any of the methods described herein, the flow rate is less than about any of 50 material volumes/hr, 40 material volumes/hr, or 30 material volumes/hr. The flow rate can be between about any of 5 material volumes/hr and 50 material volumes/hr, 10 material volumes/hr and 40 material volumes/hr, or 18 material volumes/hr and 36 material volumes/hr. In some embodiments, the flow rate is about any of 9 material volumes/hr, 18 material volumes/hr, 25 material volumes/hr, 30 material volumes/hr, 36 material volumes/hr, or 40 material volumes/hr.

In some embodiments, the flow rate is less than about any of 90 column volumes (CV)/hour; 80 CV/hr; 70 CV/hr; 60

CV/hr; 50 CV/hr; 40 CV/hr, or 30 CV/hr. The flow rate may be between about any of 5 CV/hr and 50 CV/hr, 10 CV/hr and 40 CV/hr, or 18 CV/hr and 36 CV/hr. In some embodiments, the flow rate is about any of 9 CV/hr, 18 CV/hr, 25 CV/hr, 30 CV/hr, 36 CV/hr, or 40 CV/hr. In some embodiments of any of the methods described herein, the flow rate is less than about any of 100 cm/hr, 75 cm/hr, or 50 cm/hr. The flow rate may be between about any of 25 cm/hr and 150 cm/hr, 25 cm/hr and 100 cm/hr, 50 cm/hr and 100 cm/hr, or 65 cm/hr and 85 cm/hr.

Furthermore, the process of the present invention results in time savings for column regeneration. In some embodiments, the time in contact with the cleaning buffers is reduced from the typical 75 minutes to 30 minutes, or even about 9 minutes, allowing additional multiple additional purifications using the same resin in a short time period.

Contaminants

In some embodiments of the methods described herein, the at least one contaminant can be any one or more of host cell material, leached Protein A, nucleic acid, a variant, fragment, aggregate or derivative of the desired polypeptide, another polypeptide, endotoxin, viral contaminant, cell culture media component, carboxypeptidase B, gentamicin, etc. In some examples, the contaminant can be a host cell protein (HCP) from, for example but not limited to, a bacterial cell such as an E. coli cell, an insect cell, a prokaryotic cell, a eukaryotic cell, a yeast cell, a mammalian cell, an avian cell, a fungal cell.

Leached Protein A is Protein A detached or washed from a solid phase to which it is bound. For example, leached Protein A can be leached from Protein A chromatography material. The amount of Protein A may be measured, for example, using an enzyme linked immunosorbent assay (ELISA). In some embodiments of any of the methods described herein, the amount of leached Protein A is reduced by greater than about any of 10%, 20%, 30%, 40%, 50%, 60%, 70%, 80%, or 90%. The amount of leached Protein A may be reduced by between about any of 10% and 99%, 30% and 95%, 30% and 99%, 50% and 95%, 50% and 99%, 75% and 99%, or 85% and 99%. In some embodiments, the amount of leached Protein A is reduced by about any of 10%, 20%, 30%, 40%, 50%, 60%, 70%, 80%, 90%, or 95%. In some embodiments, the reduction is determined by comparing the amount of leached Protein A in the composition recovered from a purification step(s) to the amount of leached Protein A in the composition before the purification step(s).

Host cell proteins (HCP) are proteins from the cells in which the polypeptide was produced. The amount of HCP can be measured by ELISA or Meso Scale Discovery ("MSO"). In some embodiments of any of the methods described herein, the amount of HCP in the eluate is at a minimum in a mock elution. In some embodiments, the level of host cell protein in an eluate from a mock elution is compared with and without cleaning method or before and after cleaning method.

Methods of measuring DNA such as host cell DNA are known in the art. In some embodiments of any of the methods described herein, the amount of DNA is reduced by greater than about any of 10%, 20%, 30%, 40%, 50%, 60%, 70%, 80%, or 90%. The amount of DNA may be reduced by between about any of 10% and 99%, 30% and 95%, 30% and 99%, 50% and 95%, 50% and 99%, 75% and 99%, or 85% and 99%. The amount of DNA may be reduced by about any of 10%, 20%, 30%, 40%, 50%, 60%, 70%, 80%, 90%, 95%, or 99%. In some embodiments, the reduction is determined by comparing the amount of DNA in the composition recovered from a purification step(s) to the amount of DNA in the composition before the purification step(s).

Fragment polypeptides can be low molecular weight (LMW) proteins. In some embodiments, the fragmented polypeptide is a fragment of the polypeptide of interest. Examples of LMW protein include, but not limited to, a Fab (Fragment antigen binding), Fc (fragment, crystallizable) regions or combination of both or any random fragmented part of an antibody of interest. Methods of measuring fragmented protein (e.g., LMW protein) are known in the art and described in the examples section. In some embodiments of any of the methods described herein, the amount of LMW protein is reduced by greater than about any of 5%, 10%, 20%, 30%, 40%, 50%, 60%, 70%, 80%, 90%, or 95%. The amount of LMW protein may be reduced by between about any of 10% and 99%, 30% and 95%, 30% and 99%, 50% and 95%, 50% and 99%, 75% and 99%, or 85% and 99%. The amount of LMW protein may be reduced by about any of 5%, 10%, 20%, 30%, 40%, 50%, 60%, 70%, 80%, 90%, or 95%. In some embodiments, the reduction is determined by comparing the amount of fragmented protein (e.g., LMW protein) in the composition recovered from a purification step(s) to the amount of fragmented protein (e.g., LMW protein) in the composition before the purification step(s).

Aggregated polypeptides can be high molecular weight (HMW) protein. In some embodiments, the aggregated polypeptide is multimers of the polypeptide of interest. The HMW protein may be a dimer, up to 8× monomer, or larger of the polypeptide of interest. Methods of measuring aggregated protein (e.g., HMW protein) are known in the art. In some embodiments, the level of HMW in a mock elution is at a minimum; e.g., less than about 5 ppm, less than about 4 ppm, less than about 3 ppm, less than about 2 ppm or less than about 1 ppm. In some embodiments of any of the methods described herein, the amount of aggregated protein is reduced by greater than about any of 5%, 10%, 20%, 30%, 40%, 50%, 60%, 70%, 80%, 90%, or 95%. The amount of aggregated protein may be reduced by between about any of 10% and 99%, 30% and 95%, 30% and 99%, 50% and 95%, 50% and 99%, 75% and 99%, or 85% and 99%. The amount of aggregated protein may be reduced by about any of 5%, 10%, 20%, 30%, 40%, 50%, 60%, 70%, 80%, 90%, or 95%. In some embodiments, the reduction is determined by comparing the amount of aggregated protein (e.g., HMW protein) in the composition recovered from a purification step(s) to the amount of aggregated protein (e.g., HMW protein) in the composition before the purification step(s).

Cell culture media component refers to a component present in a cell culture media. A cell culture media may be a cell culture media at the time of harvesting cells. In some embodiments, the cell culture media component is gentamicin. The amount of gentamicin may be measured by ELISA. In some embodiments of any of the methods described herein, the amount of cell culture media component is reduced by greater than about any of 10%, 20%, 30%, 40%, 50%, 60%, 70%, 80%, or 90%. The amount of cell culture media component may be reduced by between about any of 10% and 99%, 30% and 95%, 30% and 99%, 50% and 95%, 50% and 99%, 75% and 99%, or 85% and 99%. In some embodiments, the amount of cell culture media component is reduced by about any of 10%, 20%, 30%, 40%, 50%, 60%, 70%, 80%, 90%, 95%, or 98%. In some embodiments, the reduction is determined by comparing the amount of cell culture media component in the composition recovered from a purification step(s) to the amount of cell culture media component in the composition before the purification step(s).

Polypeptides

The methods of the invention may be used to clean chromatography material used in the purification of multiple polypeptide preparations. In some embodiments, the chromatography material is used in large-scale; e.g., manufacturing-scale production of polypeptides such as antibodies or fragments thereof. In some embodiments, a chromatography material is used in the purification of a first polypeptide, such as a first antibody, the material is then cleaned by the methods of the invention, and then the chromatography material can be used to purify a second polypeptide, such as a second antibody. In some embodiments, the cleaning is effective such that the preparation comprising the second purified polypeptide is essentially free of the first polypeptide. In some embodiments, the preparation comprising the second purified polypeptide (e.g. a second antibody) comprises less than 1 ppm of the first polypeptide (e.g. a first antibody). In some embodiments, the second purified polypeptide comprises less than any one of 1 ppm, 2 ppm, 3 ppm, 4 ppm, 5 ppm, 10 ppm, 20 ppm, 30 ppm, 40 ppm, 50 ppm or 100 ppm of the first polypeptide.

In some embodiments, the methods of the invention are used to reuse chromatography material used to purify therapeutic polypeptides. In some embodiments, the polypeptide is an antagonist. In some embodiments, the polypeptide is an agonist. In some embodiments, the polypeptide is an antibody. In some embodiments, the polypeptide is epitope tagged. In some embodiments, the polypeptide retains a biological and/or immunological activity. In some embodiments, the polypeptide is an antagonist. In some embodiments, the polypeptide initiates complement dependent cytotoxicity. In some embodiments the polypeptide is an antibody or immunoadhesin.

The polypeptides to be purified using regenerated chromatography material cleaned by the methods described herein are generally produced using recombinant techniques. Methods for producing recombinant proteins are described, e.g., in U.S. Pat. Nos. 5,534,615 and 4,816,567, specifically incorporated herein by reference.

The polypeptides can be produced recombinantly in eukaryotic cells or prokaryotic cells. The proteins can be derived from genetically engineered plants, transgenic animals, or can be secreted by production cells adapted to grow in cell culture. Production cells can be bacterial (e.g., *E. coli*, *Streptomyces* spp., and *Bacillus* spp.), fungal (e.g., *Aspergillus*), invertebrate-derived (e.g., insect) or mammalian. Examples of mammalian cells commonly used in the industry are CHO, VERO, BHK, HeLa, CV 1 (including Cos), MDCK, 293, 3T3, myeloma cell lines (especially murine), PC12 and W138 cells. Particularly preferred host cells are Chinese hamster ovary (CHO) cells, which are widely used for the production of several complex recombinant proteins, e.g. cytokines, clotting factors, and antibodies (Brasel et al., 1996, Blood 88:2004-2012; Kaufman et al., 1988, J. Biol Chem 263: 6352-6362; McKinnon et al., 1991, J Mol Endocrinol 6:231-239; Wood et al., 1990, J. Immunol 145: 3011-3016). The dihydrofolate reductase (DHFR)-deficient mutant cell line (Urlaub et al., 1980, Proc Natl Acad Sci USA 77:4216-4220), DXB11 and DG-44, are the CHO host cell lines of choice because the efficient DHFR selectable and amplifiable gene expression system allows high level recombinant protein expression in these cells (Kaufman R.

J., 1990, Meth Enzymol 185:527-566). In addition, these cells are easy to manipulate as adherent or suspension cultures and exhibit relatively good genetic stability. CHO cells and recombinant proteins expressed in them have been extensively characterized and have been approved for use in clinical manufacturing by regulatory agencies.

The polypeptides to be purified using regenerated chromatography material cleaned by the methods described herein may be recovered from culture medium or from host cell lysates. Cells employed in expression of the polypeptides can be disrupted by various physical or chemical means, such as freeze-thaw cycling, sonication, mechanical disruption, or cell lysing agents. If the polypeptide is produced intracellularly, as a first step, the particulate debris, either host cells or lysed fragments, are removed, for example, by centrifugation or ultrafiltration. Carter et al., Bio/Technology 10: 163-167 (1992) describe a procedure for isolating polypeptides which are secreted to the periplasmic space of *E. coli*. Briefly, cell paste is thawed in the presence of sodium acetate (pH 3.5), EDTA, and phenylmethylsulfonylfluoride (PMSF) over about 30 minutes. Cell debris can be removed by centrifugation. Where the polypeptide is secreted into the medium, supernatants from such expression systems are generally first concentrated using a commercially available polypeptide concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants.

Examples of polypeptides that may be purified using reusable chromatography material cleaned by the methods described herein include but are not limited to immunoglobulins, immunoadhesins, antibodies, fusion proteins, Fe-containing proteins, and immunoconjugates.

The resulting expressed polypeptide can then be purified, or partially purified, from such culture or component (e.g., from culture medium or cell extracts or bodily fluid) using known processes in combination with the methods of the invention. By "partially purified" means that some fractionation procedure, or procedures, have been carried out, but that more polypeptide species (at least 10%) than the desired protein is present. By "purified" is meant that the protein is essentially homogeneous, i.e., less than 1% contaminating proteins are present. Fractionation procedures can include but are not limited to one or more steps of filtration, centrifugation, precipitation, phase separation, affinity purification, gel filtration, ion exchange chromatography, hydrophobic interaction chromatography (HIC; using such resins as phenyl ether, butyl ether, or propyl ether), HPLC, or some combination of above. Any of the above chromatography resins can be cleaned and regenerated using the methods of the invention.

The desired degree of final purity depends on the intended use of the polypeptide. A relatively high degree of purity is desired when the polypeptide is to be administered in vivo, for example. In such a case, the polypeptides are purified such that no polypeptide bands corresponding to other polypeptides are detectable upon analysis by SDS-polyacrylamide gel electrophoresis (SDS-PAGE). It will be recognized by one skilled in the pertinent field that multiple bands corresponding to the polypeptide can be visualized by SDS-PAGE, due to differential glycosylation, differential post-translational processing, and the like. Most preferably, the polypeptide of the invention is purified to substantial homogeneity, as indicated by a single polypeptide band upon analysis by SDS-PAGE. The polypeptide band can be visualized by silver staining, Coomassie blue staining, or (if the polypeptide is radiolabeled) by autoradiography.

The present invention is further illustrated by the following examples which should not be construed as further limiting. The contents of all references cited throughout this application are expressly incorporated herein by reference.

EXAMPLES

Resin cleaning is a critical element in maintaining suitably long lifetimes of Protein A columns for mAb purification. Efficient resin cleaning is also critical for maintaining a sustainable costs of materials, since Protein A resin is one of the most costly consumables utilized for downstream processing.

The impact of fouling affects column lifetime by decreasing binding capacity through spatial limitation and reduction of the overall intraparticle porosity, making the adsorption of mAb more difficult as this foulant concentration increases. Higher caustic concentrations prove to remove foulant buildup, but sacrifice capacity due to increases in ligand hydrolysis. Additives in the caustic solution have proven to be marginally effective in reducing the rate of ligand hydrolysis, such as ethylene glycol, propylene glycol, sodium sulfate and sodium citrate.

New formulations for cleaning solutions are sought with new generations of caustic stable Protein A resins that will increase productivity and effectiveness overall.

Materials & Methods

TABLE 1

Raw Material List

| Reagent | Grades | CAS # |
|---|---|---|
| Acetic Acid, Glacial | USP-FCC | 64-19-7 |
| Benzyl Alcohol | NF-FCC | 100-51-6 |
| Sodium Acetate Trihydrate | NF/EP | 6131-90-4 |
| Sodium Bicarbonate | USP | 144-55-8 |
| Sodium Carbonate, Anhydrous | NF/EP | 497-19-8 |
| Sodium Chloride | ACS | 7647-14-5 |
| Sodium Citrate Dihydrate | Reagent | 4/3/6132 |
| Sodium Hydroxide, 10N | Non-Compendial | 1310-73-2 |
| Sodium Phosphate Monobasic Monohydrate | USP | 10049-21-5 |
| Sodium Phosphate Dibasic Heptahydrate | ACS | 7782-85-6 |
| Phosphoric Acid (85%) | NF-FCC | 7664-38-2 |
| Polysorbate 80 | NF | 9005-65-6 |

Resin and Load Material

The protein A columns used for the experiments were 0.8 cm i.d.×5.0 cm bed height, packed with Mabselect SuRe LX Resin (GE Healthcare, Uppsala, Sweden) in MiniChrom hardware (Repligen, Waltham, MA). The experiments for the cleaning study were carried out on an ÄKTA Avant 150 System (GE Healthcare) with clarified cell culture harvests of 4.1 to 4.6 g/L titers as load materials. Additional experiments were performed with the same resin in 1 cm i.d.×10 cm bed height Omnifit glass columns (Kinesis), also carried out on an ÄKTA Avant 150 System (GE Healthcare) with clarified cell culture harvests of 4.1 to 4.6 g/L titers as load materials.

Analytics

The product concentration for the capture runs was determined using UV absorbance at 280 nm with a DropSense96 UV-Vis Spectrophotometer (Trinean, Gentbrugge, Belgium). ELISA for quantification of residual CHO-HCP and rProA was conducted in a high throughput manner using the Tecan Liquid Handling System (Morrisville, NC). HCP levels were quantified using the CHO HCP 3rd Generation Kit (Cygnus Technologies, Southport, NC) while rProA was quantified using Repligen Protein-A ELISA kit (Repligen Corporation, Waltham, MA) according to manufacturer's protocol. Residual CHO DNA (rDNA) in the samples was measured using real-time quantitative PCR (RT-qPCR). Size exclusion chromatography (SEC) was conducted using a Waters' Acquity H-Class Bio UPLC to measure the monomer and aggregate content in the product pool. Quantification of monomer, low-molecular and the high-molecular-weight species was performed using Empower Software (Waters Corp.).

Chromatography Method

The Mab Select SuRe LX Protein A column operates in bind-and-elute mode. Multiple Protein A cycles were performed for each cleaning protocol until the end criteria was met. The criteria was be the yield (<80%) and/or delta column pressure (>3.00 MPa). The summary of the steps, residence time, and buffer column volume (CV) requirements for the Mab Select SuRe LX Protein A chromatography operation is presented in Table 2.

TABLE 2

Summary of Operating Conditions for Protein A Chromatography

| Step | Buffer/Material | CVs | Residence Time (min) |
|---|---|---|---|
| Equilibration | 20 mM Sodium Phosphate, 150 mM Sodium Chloride, pH 7.2 | 5 | 3 |
| Load | Clarified Bulk Harvest (CB) | N/A | 6 |
| Wash 1 | 20 mM Sodium Phosphate, 150 mM Sodium Chloride, pH 7.2 | 2 | 3 |
| Wash 2 | 50 mM Sodium Carbonate, 0.1M Sodium Chloride, 0.5% Polysorbate-80, pH 10.0 | 5 | 3 |
| Wash 3 | 20 mM Citrate-Phosphate, pH 5.1 | 5 | 3 |
| Elution | 20 mM Citrate-Phosphate, pH 3.4 | 5 | 3 |
| CIP1 | a | 3 | 3 |
| Neutralization 1 | 20 mM Sodium Phosphate, 150 mM Sodium Chloride, pH 7.2 | 2 | 3 |
| CIP 2 | b | 3 | 3 |
| Neutralization 2 | 20 mM Sodium Phosphate, 150 mM Sodium Chloride, pH 7.2 | 2 | 3 |
| Storage | 2% (v/v) Benzyl Alcohol | 3 | 3 | a Table 3 lists CIP 1 buffers
b Table 3 lists CIP 2 buffers

The Protein A column was equilibrated with 3 CVs of 20 mM Sodium Phosphate, 150 mM Sodium Chloride, pH 7.2 buffer. 1 M Sodium Chloride was then injected into the column and equilibration with the 20 mM Sodium Phosphate, 150 mM Sodium Chloride, pH 7.2 buffer was continued for 2 CVs. After equilibration, clarified bulk was loaded onto the column at 2° C. to 8° C. with a loading target of 45 g/L resin. The column was then washed with 2 CVs of 20 mM Sodium Phosphate, 150 mM Sodium Chloride, pH 7.2 buffer followed by washing with 5 CVs of 50 mM Carbonate, 100 mM Sodium Chloride, 0.5% Polysorbate-80, pH 10.0, and then washed with 5 CVs of 20 mM Citrate Phosphate, pH 5.1. The column was eluted with a 20 mM Citrate Phosphate, pH 3.4 buffer. The eluate was collected for the entire 5 CVs, and the eluate from each cycle was collected into a separate vessel. Following the elution, the Protein A column was cleaned-in-place with 3 CVs of CIP 1 buffer, neutralized with the 2 CVs of 20 mM Sodium Phosphate, 150 mM Sodium Chloride, pH 7.2 buffer and then sanitized with 3 CVs of CIP 2 buffer. If there was no CIP 1 in the given cleaning protocol, then CIP 1 and neutralization 1 were not performed for that chromatography method. Similarly, if there was no CIP 2 in the given cleaning protocol both the CIP 2 and neutralization 2 were skipped for that chromatography method. Since the Protein A column was to be cycled again, it was re-equilibrated for a second time with 3 CVs of 20 mM Sodium Phosphate, 150 mM Sodium Chloride, pH 7.2 buffer followed by loading and subsequent steps leading up to elution, cleaning-in-place and sanitization. After the final cycle's CIP steps, an equilibration step of 3 CVs of 20 mM Sodium Phosphate, 150 mM Sodium Chloride, pH 7.2 was carried out followed by storage of the column with 3 CV of 2% (v/v) Benzyl Alcohol.

The equation for calculating Protein A step yield is $$\text{Yield \%} = \frac{(\text{Volume of elution sample [mL]}) \times (\text{Concentration of elution sample[mg/mL]})}{(\text{Volume of feed [mL]}) \times (\text{Concentration of feed [mg/mL]})} \times 100 = \frac{\text{Mass of product out [mg]}}{\text{Mass of product in [mg]}} \times 100$$

The delta column pressure, or differential column pressure, is described as the pressure drop across the packed bed of a column, i.e. pre-column pressure [MPa]–post-column pressure [MPa].

TABLE 3

Cleaning Buffers

| Cleaning Protocol | CIP 1 Buffer/Solution | CIP 2 Buffer/Solution |
|---|---|---|
| 1 | 120 mM Phosphoric Acid, 167 mM Acetic Acid, 2% (v/v) Benzyl Alcohol | 20 mM Sodium Hydroxide, 200 mM Sodium Citrate, 1% (v/v) Benzyl Alcohol |
| 2 | 120 mM Phosphoric Acid, 167 mM Acetic Acid, 2% (v/v) Benzyl Alcohol | N/A |
| 3 | 120 mM Phosphoric Acid, 167 mM Acetic Acid | 20 mM Sodium Hydroxide, 200 mM Sodium Citrate |
| 4 | 120 mM Phosphoric Acid, 167 mM Acetic Acid | N/A |
| 5 | 167 mM Acetic Acid | N/A |
| 6 | 167 mM Acetic Acid, 1% (v/v) Benzyl Alcohol | 200 mM Sodium Hydroxide, 1% (v/v) Benzyl Alcohol |
| 7 | 120 mM Phosphoric Acid | N/A |
| 8 | 120 mM Phosphoric Acid, 1% (v/v) Benzyl Alcohol | 200 mM Sodium Hydroxide, 1% (v/v) Benzyl Alcohol |
| 9 | N/A | 200 mM Sodium Hydroxide, 1% (v/v) Benzyl Alcohol |
| 10 | N/A | 300 mM Sodium Hydroxide, 200 mM Sodium Citrate |
| 11 | N/A | 500 mM Sodium Hydroxide, 200 mM Sodium Citrate |
| 12 | 167 mM Acetic Acid, 2% (v/v) Benzyl Alcohol | 100 mM Sodium Hydroxide, 200 mM Sodium Citrate, 1% (v/v) Benzyl Alcohol |

Additional cycling studies with 1 cm i.d.×10 cm bed height Mab Select SuRe LX columns were performed with cleaning protocol 12 in Table 3. In this cleaning regimen, the residence time for each CIP step (CIP 1 and CIP 2) was 5 minutes (instead of 3 minutes), to allow for a 15 minute contact time of each CIP solution under dynamic flow conditions. Two cycling studies were performed in parallel using a 5 or a 30 minute static hold following the CIP 2 step, bringing the cumulative contact time of CIP 2 solution to 20 and 45 minutes, respectively.

Results & Discussion

The results from this study indicate that yield and delta column pressure are affected by insufficient removal of foulants, in combination with incompatible solution components, such as phosphoric acid, which exasperate the degree of fouling and impact delta column pressure. The mechanism of this interaction is not completely understood. FIG. 1 displays the step yield for cleaning protocols 1, 2, 3, and 6 over the course of indicated purification cycles. Cleaning protocol 1, which is meant to represent the control case, possesses a gradual yield decline with a sharp turn downward at approximately cycle 65. This case uses phosphoric acid in the CIP 1 step as well as a low concentration of sodium hydroxide in the CIP 2 step, so it may be inferred that the removal of foulants is insufficient and leads to column degradation. This case was ended due to column over pressurization, most probably due to the low pH environment provided in the CIP 1 condition. The removal of the CIP 2 step (cleaning protocol 2) displays worse process performance, as the CIP 2 cleaning is fully removed and provides no column cleaning besides the phosphoric/acetic acid condition of CIP 1, and similarly, sees a steep downturn in yield around cycle 60. Cleaning protocol 3 removes the benzyl alcohol content from the CIP solutions used in cleaning protocol 1, and with this removal, displays a much more sustained process performance, until yield greatly decreases around cycle 120. This suggests that benzyl alcohol may also be a potential agent that negatively impacts the column cleaning efficiency and overall yield. Organic solutions have been shown to have a precipitative effect with peptides, proteins and nucleic acids, so it seems plausible that this effect may be present on the column which has residual proteinaceous foulant material due to insufficient removal. Cleaning protocol 6 displays a gradual decrease in yield, but no steep downturn is present in the 170 cycles that were performed. Even though benzyl alcohol remained in the CIP solutions used here, the removal of phosphoric acid and the increase of sodium hydroxide content from 20 mM to 200 mM proved to be much more beneficial for the step yield. The foulant cleaning afforded by the higher concentration of hydroxide is key in maintaining the process performance.

An alternative cleaning protocol, using 167 mM Acetic Acid, 2% (v/v) Benzyl Alcohol for the CIP 1 step and 100 mM Sodium Hydroxide, 200 mM Sodium Citrate, 1% (v/v) Benzyl Alcohol for the CIP 2 step (Cleaning Protocol 12 in Table 3) has also been evaluated using 1 cm i.d.×10 cm bed height MabSelect SuRe LX columns. In this formulation, an intermediate concentration of sodium hydroxide (100 mM) was utilized in order to curtail the effect of ligand degradation, while still providing sufficient cleaning of the stationary phase. Cycling studies using a 20 and 45 minute cumulative contact time of CIP 2 solution were carried out to assess the degree of resin cleaning and ligand degradation using this cleaning regimen.

Figure 8:
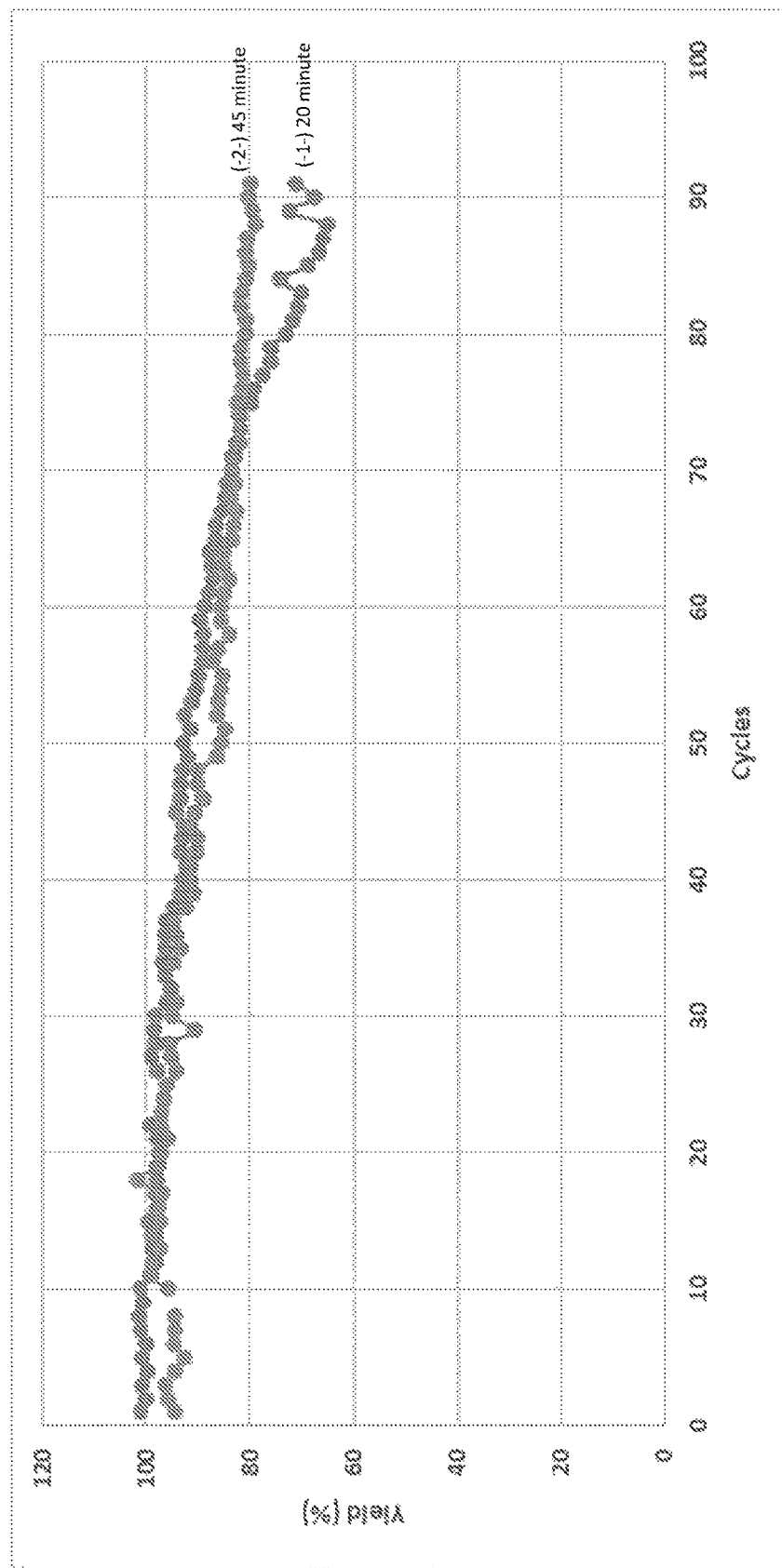
FIG. 8 shows Protein A step yield for cleaning protocol 12 with 20 minute CIP 2 contact time and with 45 minute CIP 2 contact time.

FIG. 8 displays the yield trends for Cleaning Protocol 12 carried out for 91 Protein A cycles. Overall the trend decreases almost linearly for both the 20 min contact time and 45 minute contact time cases. It should be noted that both these cases have a longer overall contact time with the CIP 2 solution than those of Cleaning Protocols 1 to 11, which only possess 9 minute overall contact times with their respective CIP solutions (i.e. 3 minute residence time for 3 column volumes=9 minutes). This linear decrease may be tied to the degradation of ligand on the stationary phase due to exposure to the harsh cleaning solution. However, the 100 mM sodium hydroxide formulation allows for adequate cleaning and removal of proteinacious foulant material.

Figure 9:
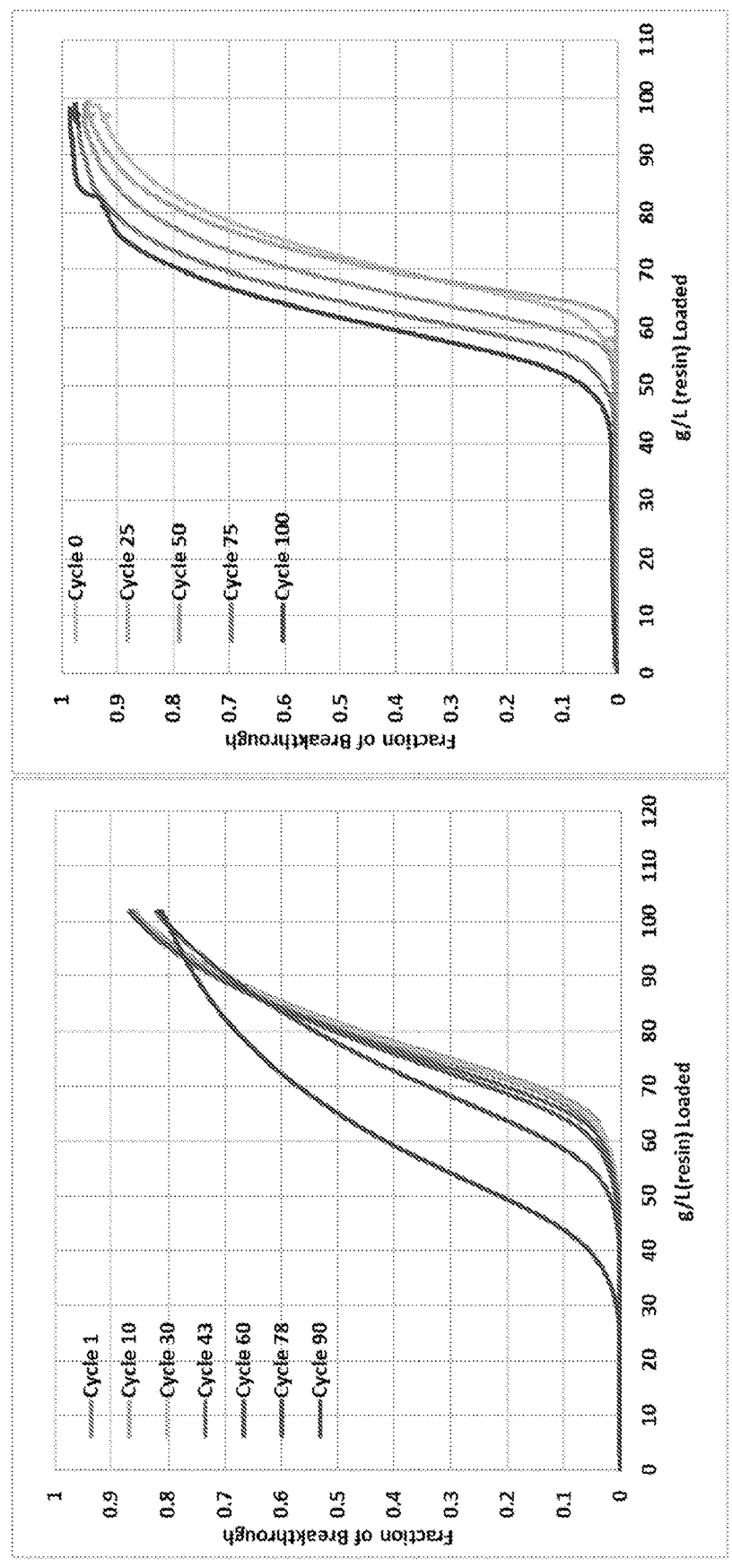
FIG. 9 shows Protein A DBC curves for cleaning protocol 12 for 20 minute CIP 2 contact time (left) and for 45 minute CIP 2 contact time (right) over 100 cycles.

FIG. 9 shows the dynamic binding capacity (DBC) curves performed separately with the columns used to test Cleaning Protocol 12. These curves were captured using pre-clarified mAb from process intermediates, and loaded to beyond 100 g/L resin loading on the columns. The general shift of these breakthrough curves to the left is indicative of a decrease in binding capacity, that may be tied to degradation of the ligand, and hence, a lowering of affinity to mAb product. The characteristic shapes of these curves for the 20 minute contact time case do indicate that more fouling is occurring in this column, but the yield impact observed is negligible compared to the overall steps yields for both the 20 and 45 minute contact time cases.

Though Cleaning Protocol 6 presented a well-working scenario with a 9 minute contact time, longer contact times are typically needed in manufacturing settings to ensure the cleaning reagents have sufficed bactericidal and fungicidal effectiveness. The longer contact times explored in the case for Cleaning Protocol 12 are more realistic in this sense, which was why the intermediate value of 100 mM Sodium Hydroxide was chosen in order to lessen the effect that the caustic solution had on degrading the Protein A ligand.

The microbial kill (LRV) of different solutions applied for various times (contact times) was determined (FIG. 7). 167 mM Acetic Acid, 2% (v/v) Benzyl Alcohol (CIP 1 buffer) and 200 mM Sodium Hydroxide, 200 mM Sodium Citrate, 1% (v/v) Benzyl Alcohol (CIP 2 buffer) were found to be most efficient among the solutions tested at the preferred contact time of 15 minutes.

Conclusion

Figure 2:
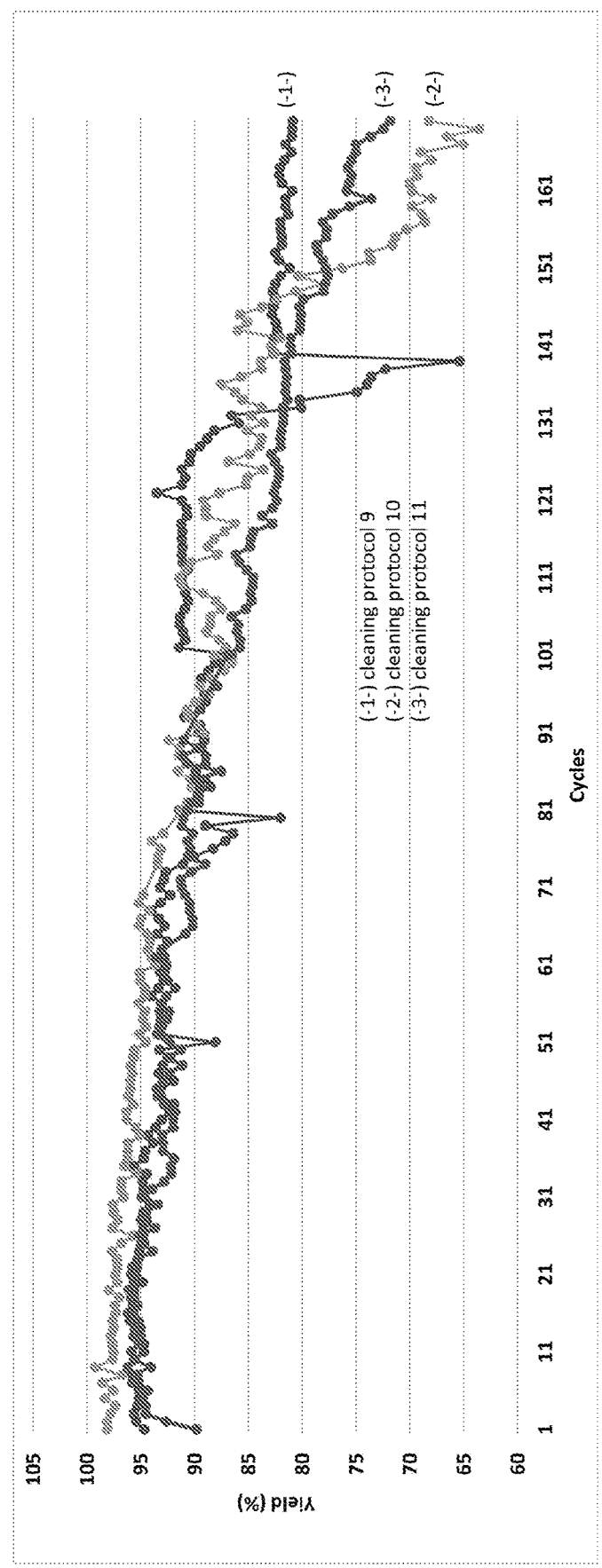
FIG. 2 shows the Protein A step yield at increasing purification cycle number for cleaning protocol 9 (-1-), cleaning protocol 10 (-2-) and cleaning protocol 11 (-3-).
Figure 3:
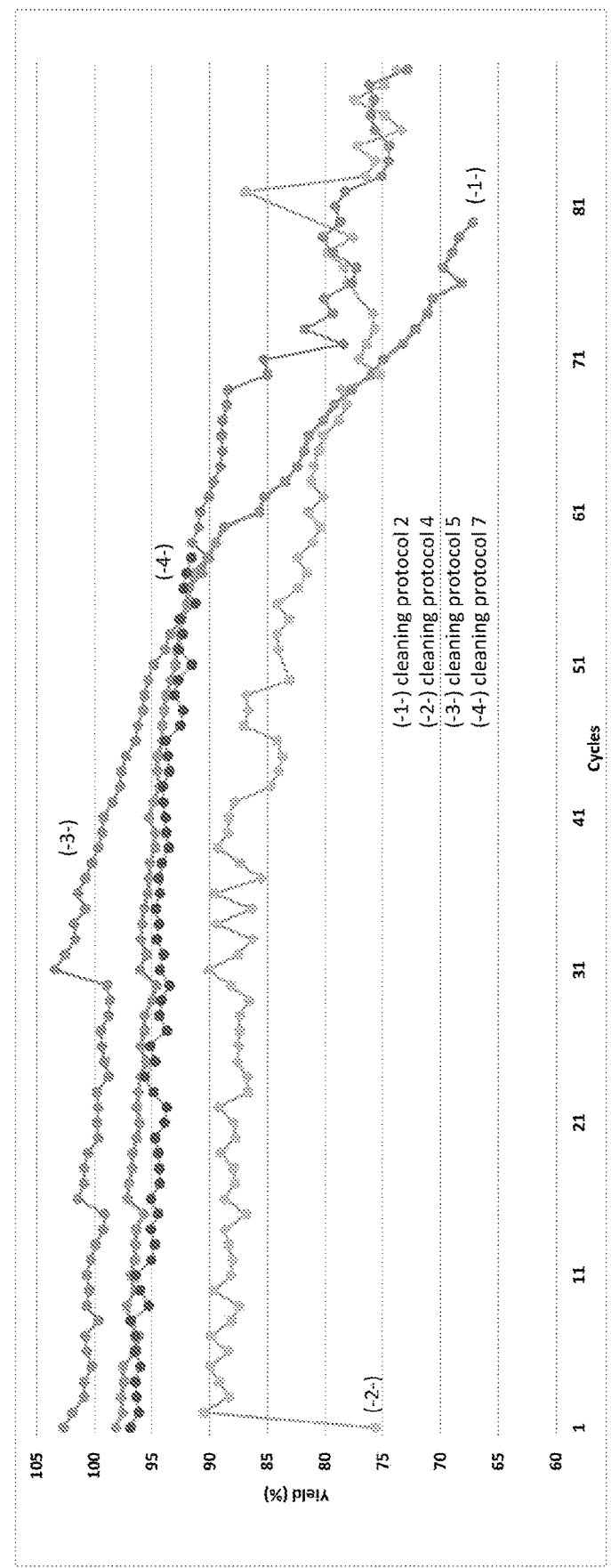
FIG. 3 shows the Protein A step yield at increasing purification cycle numbers for cleaning protocol 2 (-1-), cleaning protocol 4 (-2-), cleaning protocol 5 (-3-) and cleaning protocol 7 (-4-).
Figure 4:
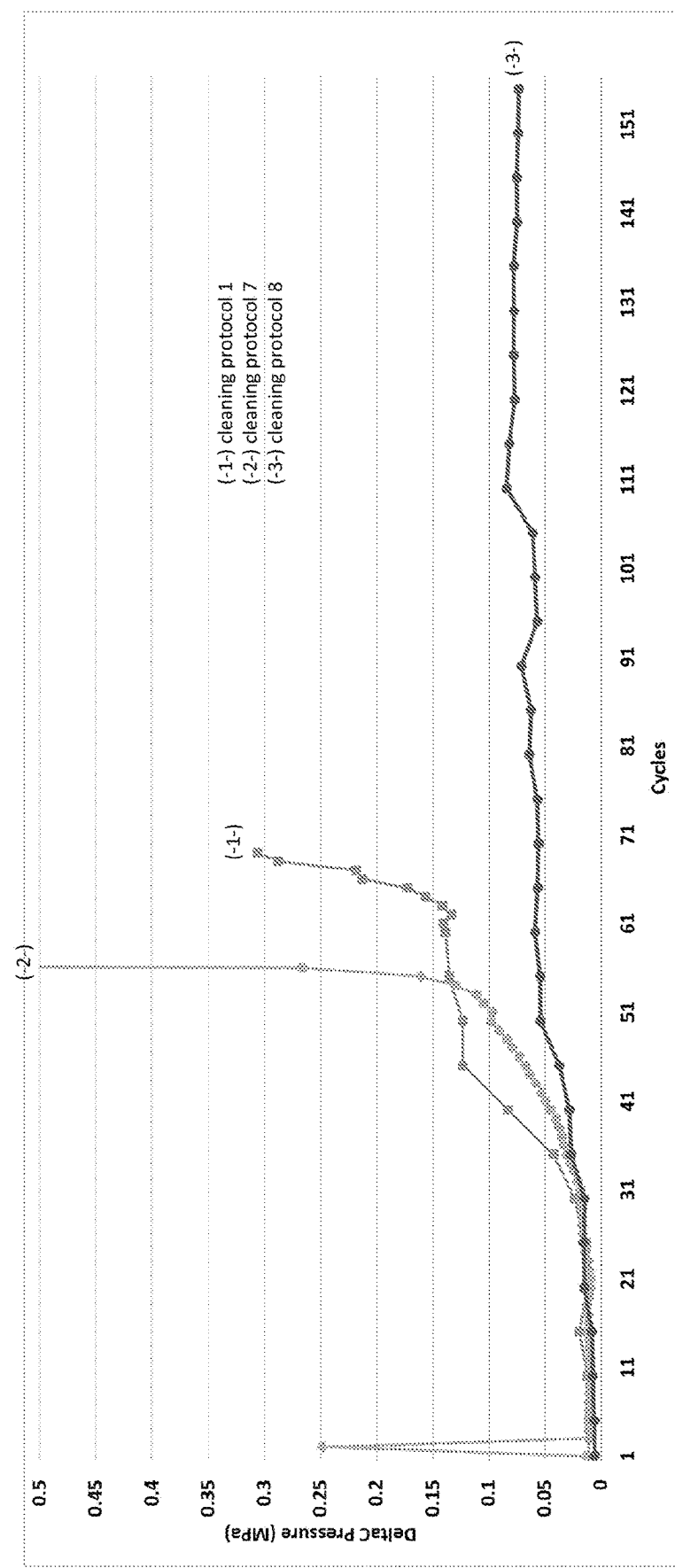
FIG. 4 shows the delta column pressure at increasing purification cycle numbers for cleaning protocol 1 (-1-), cleaning protocol 7 (-2-), and cleaning protocol 8 (-3-).
Figure 5:
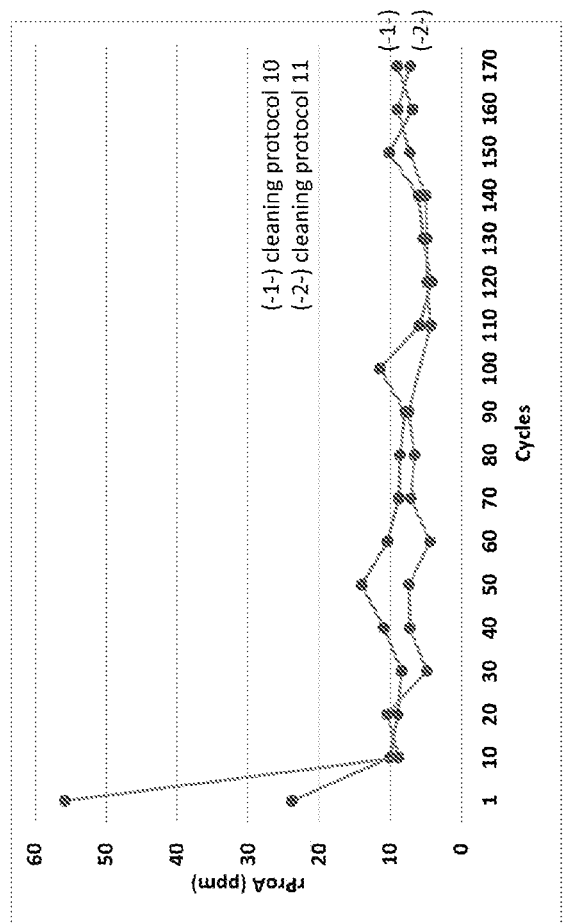
FIG. 5 shows residual Protein A (ppm) in elution fractions at increasing purification cycle numbers for cleaning protocol 10 (-1-) and cleaning protocol 11 (-2-).
Figure 6:
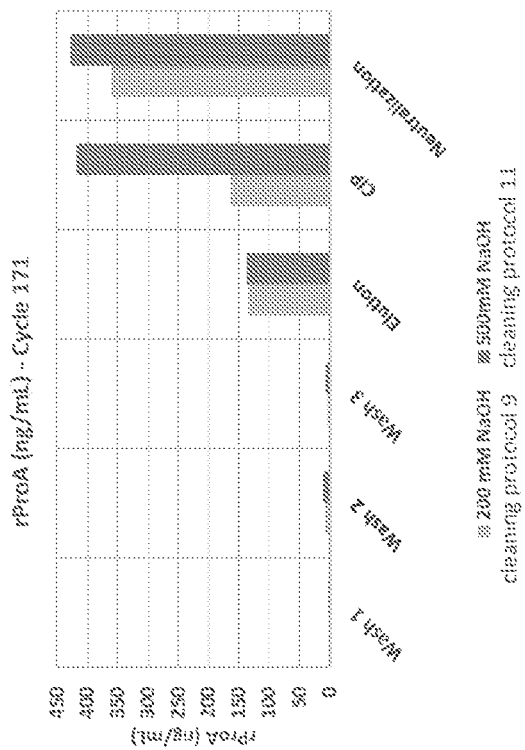
FIG. 6 shows the residual Protein A (ng/mL) in wash (wash 1, wash 2 and wash 3), elution, CIP and neutralization fractions in cycle 171 for cleaning protocol 9 and cleaning protocol 11.

The conditions from cleaning protocol 6 were determined to be the most robust out of all the cleaning protocols evaluated. Cleaning protocol 6 was able to reach 170 cycles while still maintaining a high yield (92.9%) (FIG. 1) with no significant pressure increases indicating sufficient cleaning with no significant fouling or residual Protein A leeching. Cleaning protocol 1 was only able to reach 69 cycles before significant issues arose. At 69 cycles, the yield dropped to 84.1% (FIG. 1) and the delta column pressure increased to 0.3 MPa indicating insufficient cleaning (FIG. 4). The other cleaning protocols that used phosphoric acid as one of the cleaning conditions all showed a large decay in yield or significant increase in the delta column pressure (FIGS. 1 and 4), except for the case in which higher sodium hydroxide concentrations were present in CIP 2 (cleaning protocol 8; FIG. 4). It was also observed that the runs without a CIP 2 (caustic) condition tended to foul more quickly than the runs that did have a CIP 2 condition (FIG. 3). None of these runs were able to reach 100 cycles while six out of the seven runs with a CIP 2 condition were able to exceed 100 cycles (FIGS. 1, 2 and 4). Cleaning protocols 10 and 11 were tested for ligand hydrolysis every 10 cycles for the elution pool (FIG. 5). For the final cycle of cleaning protocols 9 and 11, all of the recovery and regeneration steps were tested for ligand hydrolysis (FIG. 6). The residual Protein A levels in the elution pools were within normal specifications for both runs (FIG. 5). However, the residual Protein A levels were noticeably higher in the CIP and neutralization steps for the final cycle of both runs (FIG. 6). The high residual Protein A levels along with an appreciable decline in yield indicate that ligand hydrolysis is a factor for higher concentrations of sodium hydroxide in the CIP 2 conditions.

What is claimed is:

1. A method for cleaning a chromatography resin, comprising contacting the chromatography resin with a first buffer and a second buffer in this order, wherein the first buffer comprises acetic acid and benzyl alcohol and does not contain phosphoric acid, wherein the second buffer comprises sodium hydroxide, sodium citrate, and benzyl alcohol, wherein the chromatography resin is held in the first buffer for about 15 minutes or less under dynamic flow conditions, and wherein the chromatography resin is held in the second buffer for about 15 minutes or less under dynamic flow conditions, wherein a first neutralization buffer is passed through the chromatography resin after the first buffer and before the second buffer, and wherein a second neutralization buffer is passed through the chromatography resin after the second buffer.

2. The method of claim 1, wherein the first buffer comprises about 150-200 mM acetic acid and about 1-3% (v/v) benzyl alcohol.

3. The method of claim 1, wherein the second buffer comprises about 100-300 mM sodium hydroxide, about 100-300 mM sodium citrate, and about 0.5-1.5% (v/v) benzyl alcohol.

4. The method of claim 1, wherein the first buffer comprises about 167 mM acetic acid.

5. The method of claim 1, wherein the first buffer comprises about 2% (v/v) benzyl alcohol.

6. The method of claim 1, wherein the second buffer comprises about 200 mM sodium hydroxide.

7. The method of claim 1, wherein the second buffer comprises about 200 mM sodium citrate.

8. The method of claim 1, wherein the second buffer comprises about 1% (v/v) benzyl alcohol.

9. The method of claim 1, wherein the first buffer comprises about 167 mM acetic acid and about 2% (v/v) benzyl alcohol, and the second buffer comprises about 100 mM or 200 mM sodium hydroxide, about 200 mM sodium citrate and about 1% (v/v) benzyl alcohol.

10. The method of claim 1, wherein the chromatography resin resides in a chromatography column.

11. The method of claim 1, wherein the chromatography resin is an affinity resin.

12. The method of claim 11, wherein the chromatography resin comprises an affinity ligand coupled to a support, wherein the affinity ligand is *Staphylococcus* Protein A, or a portion or derivative thereof, or *Staphylococcus* Protein G, or a portion or derivative thereof.

13. The method of claim 12, wherein the resin or support comprises a polymer selected from the group consisting of polyvinylether, polyvinylalcohol, polymethacrylate, polyacrylate, polystyrene, polyacrylamide, polymethacrylamide and polycarbonate.

14. The method of claim 1, wherein the first neutralization buffer and/or the second neutralization buffer comprise sodium phosphate and sodium chloride.

15. The method of claim 1, wherein the first neutralization buffer and/or the second neutralization buffer comprise 20 mM sodium phosphate and 150 mM sodium chloride.

16. A method of purifying a polypeptide, comprising steps of applying the polypeptide to a chromatography resin and cleaning the chromatography resin using the method of claim 1.

17. The method of claim 16, wherein the polypeptide is an immunoglobulin comprising a CH2 domain and a CH3 domain, an antibody or antigen binding fragment thereof, an enzyme, a hormone, a fusion protein, an immune-conjugate, a cytokine or an interleukin.

18. The method of claim 17, wherein the antibody or antigen binding fragment thereof is an IgG monoclonal antibody, wherein the IgG monoclonal antibody is a chimeric antibody, humanized antibody, or human antibody.

19. A method for cleaning an affinity chromatography column containing a chromatography resin, comprising cleaning the chromatography resin with one or more cleaning cycles, wherein each cleaning cycle comprises contacting the chromatography resin with a first buffer comprising acetic acid and benzyl alcohol for about 15 minutes or less under dynamic flow conditions, and a second buffer comprising sodium hydroxide, sodium citrate, and benzyl alcohol for about 15 minutes or less under dynamic flow conditions, wherein a first neutralization buffer is passed through the chromatography resin after the first buffer and before the second buffer, and wherein a second neutralization buffer is passed through the chromatography resin after the second buffer.

20. A method for cleaning a chromatography resin, comprising contacting the chromatography resin with a first buffer and a second buffer in this order, wherein the first buffer comprises about 167 mM acetic acid, about 2% (v/v) benzyl alcohol, and does not contain phosphoric acid, wherein the second buffer comprises about 100 mM or 200 mM sodium hydroxide, about 200 mM sodium citrate and about 1% (v/v) benzyl alcohol, wherein the chromatography resin is held in the first buffer for about 15 minutes or less under dynamic flow conditions, and wherein the chromatography resin is held in the second buffer for about 15 minutes or less under dynamic flow conditions.

* * * * *